United States Patent
Springer et al.

(10) Patent No.: US 11,344,913 B1
(45) Date of Patent: May 31, 2022

(54) COMPOSITION FOR AEROSOL CANS, METHOD OF MAKING AND USING THE SAME

(71) Applicant: MSI Coatings Inc., Elbert, CO (US)

(72) Inventors: Matthew Kent Springer, Elbert, CO (US); Neil Brian Cramer, Boulder, CO (US)

(73) Assignee: MSI Coatings, Inc., Elbert, CO (US)

( * ) Notice: Subject to any disclaimer, the term of this patent is extended or adjusted under 35 U.S.C. 154(b) by 0 days.

(21) Appl. No.: 16/266,669

(22) Filed: Feb. 4, 2019

Related U.S. Application Data

(60) Provisional application No. 62/626,070, filed on Feb. 3, 2018.

(51) Int. Cl.
| | |
|---|---|
| *B05D 3/06* | (2006.01) |
| *C09D 4/06* | (2006.01) |
| *B05D 3/10* | (2006.01) |
| *C08K 7/14* | (2006.01) |
| *C08K 7/06* | (2006.01) |
| *C08K 7/10* | (2006.01) |
| *B65D 83/00* | (2006.01) |

(52) U.S. Cl.
CPC ............ *B05D 3/067* (2013.01); *B05D 3/102* (2013.01); *C09D 4/06* (2013.01); *B65D 83/0038* (2013.01); *C08K 7/06* (2013.01); *C08K 7/10* (2013.01); *C08K 7/14* (2013.01)

(58) Field of Classification Search
CPC .......... B05D 3/067; B05D 3/102; C09D 4/06; C08K 7/10; C08K 7/06; C08K 7/14; B65D 83/0038
See application file for complete search history.

(56) References Cited

U.S. PATENT DOCUMENTS

| | | | | |
|---|---|---|---|---|
| 2,815,889 | A | * 12/1957 | Stetz ..................... | B65D 83/32 222/402.2 |
| 3,913,842 | A | * 10/1975 | Singer .................... | B65D 83/30 239/337 |
| 4,591,522 | A | 5/1986 | Kang et al. | |

(Continued)

FOREIGN PATENT DOCUMENTS

| | | |
|---|---|---|
| EP | 0456346 | 11/1991 |
| EP | 2740584 | 6/2014 |

(Continued)

OTHER PUBLICATIONS

BYK Additives & Instruments, "BRIEF BYK Regulatory Information—Extensive Form Product name: BYK-333", Version 1.0, Apr. 26, 2017, 4 pages.

(Continued)

*Primary Examiner* — Vishal Pancholi
*Assistant Examiner* — Bob Zadeh
(74) *Attorney, Agent, or Firm* — Scott J. Hawranek

(57) ABSTRACT

A volatile organic compound (VOC) free low radiant flux radiation curable composition for aerosol containers including an acrylate-terminated compound component, a thiol monomer or oligomer component, a photoinitiator component, a surface additive component, and an ethanol-based reducer, wherein the composition does not include an acetone component. Moreover, other implementations are directed towards methods of using the aerosol containers to apply the UV Curable Composition.

20 Claims, 3 Drawing Sheets

(56) References Cited

U.S. PATENT DOCUMENTS

| | | |
|---|---|---|
| 4,879,320 A | 11/1989 | Hastings |
| 5,217,654 A | 6/1993 | Buckley |
| 5,395,862 A | 3/1995 | Neckers et al. |
| 5,451,343 A | 9/1995 | Neckers et al. |
| 5,514,519 A | 5/1996 | Neckers |
| 5,606,171 A | 2/1997 | Neckers et al. |
| 5,623,080 A | 4/1997 | Neckers et al. |
| 5,639,802 A | 6/1997 | Neckers et al. |
| 5,677,107 A | 10/1997 | Neckers |
| 5,717,217 A | 2/1998 | Neckers et al. |
| 5,942,554 A | 8/1999 | Ren et al. |
| 5,955,002 A | 9/1999 | Neckers et al. |
| 5,955,569 A | 9/1999 | Dujari et al. |
| 5,998,496 A | 12/1999 | Hassoon et al. |
| 6,153,663 A | 11/2000 | Chen et al. |
| 6,166,233 A | 12/2000 | Neckers et al. |
| 6,200,646 B1 | 3/2001 | Neckers et al. |
| 6,211,262 B1 | 4/2001 | Mejiritski et al. |
| 6,309,797 B1 | 10/2001 | Grinevich et al. |
| 6,318,996 B1 | 11/2001 | Melikechi et al. |
| 6,387,981 B1 | 5/2002 | Zhang et al. |
| 6,433,035 B1 | 8/2002 | Grinevich et al. |
| 6,461,691 B1* | 10/2002 | Taylor .................. C08F 283/10 427/518 |
| 6,479,217 B1 | 11/2002 | Grinevich et al. |
| 6,510,967 B1 | 1/2003 | DeSimone |
| 6,551,710 B1 | 4/2003 | Chen et al. |
| 6,586,494 B2 | 7/2003 | Mejiritski et al. |
| 6,838,177 B2 | 1/2005 | Fenn et al. |
| 7,204,392 B2 | 4/2007 | Kwasny et al. |
| 7,268,172 B2 | 9/2007 | Bach et al. |
| 7,399,793 B2 | 7/2008 | Braun et al. |
| 7,510,746 B2 | 3/2009 | Loeffler et al. |
| 7,553,925 B2 | 6/2009 | Bojkova |
| 7,704,564 B2 | 4/2010 | DeRegge et al. |
| 8,105,504 B2 | 1/2012 | Gerster et al. |
| 8,192,673 B2 | 6/2012 | Bowman et al. |
| 8,227,050 B1 | 7/2012 | O'Neil |
| 8,403,177 B2 | 3/2013 | Kwasny |
| 8,414,981 B2 | 4/2013 | Iezzi et al. |
| 8,513,321 B2 | 8/2013 | Martin et al. |
| 8,528,837 B2 | 9/2013 | Kwasny |
| 8,796,348 B2 | 8/2014 | Slark et al. |
| 8,828,176 B2 | 9/2014 | Powers et al. |
| 8,846,777 B2 | 9/2014 | Bowman et al. |
| 8,864,493 B2 | 10/2014 | Leslie-Martin et al. |
| 8,901,198 B2 | 12/2014 | Kania et al. |
| 8,906,468 B2 | 12/2014 | Bowman et al. |
| 8,962,709 B2 | 2/2015 | Bowman et al. |
| 9,144,816 B2 | 9/2015 | Lewis et al. |
| 9,493,292 B2 | 11/2016 | Kwasny |
| 9,598,607 B2 | 3/2017 | Komarova et al. |
| 10,307,940 B2 | 6/2019 | Springer |
| 2001/0014700 A1 | 8/2001 | Kwasny |
| 2002/0193460 A1* | 12/2002 | Kovar .................. C09D 4/06 522/6 |
| 2003/0109595 A1 | 6/2003 | Okada et al. |
| 2004/0002559 A1 | 1/2004 | Troutman et al. |
| 2005/0095371 A1 | 5/2005 | Braun et al. |
| 2005/0170101 A1* | 8/2005 | Ramsey .................. B05D 7/14 427/487 |
| 2005/0271824 A1 | 12/2005 | Loeffler et al. |
| 2006/0025522 A1 | 2/2006 | Johnson et al. |
| 2006/0084713 A1 | 4/2006 | Bach et al. |
| 2006/0154082 A1 | 7/2006 | Miller et al. |
| 2007/0205528 A1 | 9/2007 | Patel et al. |
| 2007/0284390 A1* | 12/2007 | Wang .................. B65D 83/687 222/1 |
| 2008/0025942 A1* | 1/2008 | Weiss .................. A01N 31/02 424/76.2 |
| 2008/0314500 A1 | 12/2008 | Boers et al. |
| 2009/0047546 A1 | 2/2009 | Bowman et al. |
| 2009/0270528 A1 | 10/2009 | Bowman et al. |
| 2010/0056722 A1 | 3/2010 | Thomas et al. |
| 2010/0304338 A1 | 12/2010 | Cramer et al. |
| 2011/0003080 A1 | 1/2011 | Echizen et al. |
| 2011/0097481 A1 | 4/2011 | Bowman et al. |
| 2012/0256338 A1 | 10/2012 | Bowman et al. |
| 2013/0126073 A1 | 5/2013 | Kenney |
| 2013/0216838 A1* | 8/2013 | Komarova .......... C08G 75/045 428/423.1 |
| 2013/0224495 A1* | 8/2013 | Gan .................. C04B 41/009 428/413 |
| 2013/0277890 A1 | 10/2013 | Bowman et al. |
| 2014/0060531 A1* | 3/2014 | Brambilla .......... A61M 15/0065 128/203.12 |
| 2014/0186541 A1* | 7/2014 | Clark .................. C08F 265/06 427/505 |
| 2014/0191445 A1 | 7/2014 | Rist et al. |
| 2014/0234632 A1 | 8/2014 | Nolte et al. |
| 2015/0005408 A1 | 1/2015 | Lindekens et al. |
| 2015/0009456 A1 | 1/2015 | Powers et al. |
| 2015/0239007 A1* | 8/2015 | Selwyn ................ D06M 23/02 427/488 |
| 2016/0002475 A1 | 1/2016 | Potthoff et al. |
| 2016/0075105 A1 | 3/2016 | Lamberty et al. |
| 2017/0326761 A1* | 11/2017 | Springer ................ B32B 15/20 |
| 2019/0283282 A1 | 9/2019 | Springer |

FOREIGN PATENT DOCUMENTS

| | | |
|---|---|---|
| EP | 2821436 | 1/2015 |
| WO | WO 2010/081713 | 7/2010 |
| WO | WO 2013/126413 | 8/2013 |
| WO | WO 2015/000761 | 1/2015 |
| WO | WO 2015/036414 | 3/2015 |
| WO | WO 2017/197277 | 11/2017 |

OTHER PUBLICATIONS

BYK Additives & Instruments, "BRIEF (BYK Regulatory Information—Extensive Form) Product Name: BYK-361N", Version 7.2, Aug. 19, 2016, 6 pages.

BYK Additives & Instruments, BRIEF (BYK Regulatory Information—Extensive Form) Product Name: BYK-1790, Version 7.2, Aug. 19, 2016, 6 pages.

BYK Additives & Instruments, "BRIEF (BYK Regulatory Information—Extensive Form) Product Name: BYK-1794", Version 7.2, Aug. 19, 2016, 6 pages.

BYK Additives & instruments, "BRIEF (BYK Regulatory Information—Extensive Form) Product Name: BYK-UV3575," Version 7.3, Dec. 7, 2016, 6 pages.

BYK Additives & Instruments, BRIEF (BYK Regulatory Information—Extensive Form) Product Name: BYK-UV3576, Version 7.2, Aug. 19, 2016, 6 pages.

BYK Additives & Instruments, "Food Contact Regulatory Status Information BYK®-333", Version 3.1, Mar. 8, 2017, 4 pages.

BYK Additives & Instruments, "BYK®-361 N Food Contact Regulatory Status Information", Sep. 26, 2012, 3 pages.

BYK Additives & Instruments, "Food Contact Regulatory Status Information BYK®-1790", Version 2.0. Nov. 28, 2013, 3 pages.

BYK Additives & Instruments, "Food Contact BYK Regulatory Status Information Product: BYK®-1794", Version 1.0, Sep. 5, 2017, 3 pages.

BYK Additives & Instruments, "Safety Data Sheet BYK-333" Version 6, Mar. 8, 2017, 12 pages.

BYK Additives & Instruments, "Material Safety Data Sheet BYK-361 N", Version 4, May 11, 2015, 9 pages.

BYK Additives & Instruments, "Material Safety Data Sheet BYK-1790", Version 3, May 14, 2015, 9 pages.

BYK Additives & Instruments, "Material Safety Data Sheet BYK-1794", Version 4, May 14, 2015, 10 pages.

BYK Additives & Instruments, "Safety Data Sheet BYK-UV 3575", Version 5, Jan. 26, 2016, 12 pages.

BYK Additives & Instruments, "Material Safety Data Sheet BYK-UV 3576", Version 5, May 11, 2015, 12 pages.

BYK Additives & Instruments, "BYK-333", Data Sheet Issue Nov. 2012, 4 pages.

(56) References Cited

OTHER PUBLICATIONS

BYK Additives & Instruments, "BYK-361 N", Data Sheet Issue Dec. 2012, 4 pages.
BYK Additives & Instruments, "BYK-1790", Data Sheet Issue Apr. 2013, 2 pages.
BYK Additives & Instruments, "BYK-1794", Data Sheet Issue Apr. 2016, 4 pages.
BYK Additives & Instruments, "BYK-UV 3575", Data Sheet Issue Jan. 2013, 2 pages.
BYK Additives & Instruments, "BYK-UV 3576", Data Sheet Issue Jan. 2013, 2 pages.
Evonik Industries, "ACEMATT® Matting Agents the optimum matting effect for your coating system", 2 pages, ACEMATT Handling sheet, 2016.
ACEMATT®, "ACEMATT® 3600", Product Information ACEMATT® 3600, 2 pages, Oct. 2017.
Evonik Industries, "ACEMATT® Matting agents for the coating industry Technical Overview", 32 pages, May 2016.
37 C.F.R. Part 25.853 (a) Amdt 25-116 Appendix F Part I (a)(1)(ii), 1965, 3 pages.
ASTM D638-10, "Standard Test Method for Tensile Properties of Plastics", 2015, 17 pages.
ASTM Designation D 790-03, "Standard Test Methods for Flexural Properties of Unreinforced and Reinforced Plastics and Electrical Insulating Materials", 2003, 11 pages.
BYK Additives & Instruments, BRIEF (BYK Regulatory Information—Extensive Form) Product Name: BYK-UV2576, Version 7.2, Aug. 19, 2016, 6 pages.
Nason et al., "UV-Induced Frontal Polymerization of Multifunctional (Meth)acrylates", Macromolecules 2005, 38, 5506-5512.
Van den Dungen, Eric, "Self-healing coatings based on thiol-ene chemistry", Mar. 2009, Dissertation University of Stellenbosch, 265 pages.
Husar, et al., "The formulator's guide to anti-oxcygen inhibition additives", Progress in Organic Coatings 77 (2014) 1789-1798, 10 pages.
Owusu-Adom, et al., "Photopolymerization Behavior of Thiol-Acrylate Monomers in Clay Nanocomposites", Macromolecules 2009, 42, 3275-3284, 10 pages.
Zhang, et al., "Photopolymerization behavior and properties of highly branched polyester acrylate continaing thioether linkage used for UV curing coatings", Progress in Organic Coatings 71 (2011) 48-55, 8 pages.
Nebioglu, et al., "Advances in the Chemistry of Melamine Acrylate Oligomers", 2008, 7 pages.
Willard, "Formulating for Reactivity", Rad Tech e|5 2006 Technical Proceedings, 10 pages.
Arceneaux, Ph.D., "Field Applied UV Curable Floor Coatings", Need Date, 17 pages.
Dvorchak, "1K UV-A Automotive Refinish; Clear Coats and Primers," Allnex, 2014, 31 pages.
Arceneaux, Ph.D., "Mitigation of Oxygen Inhibition in UV LED, UVA and Low Intensity UV Cure", 2014 Allnex Belgium SA, 11 pages.
O'Brien, et al., "Impact of Oxygen on Photopolymerization Kinetics and Polymer Structure", Macromolecules 2006, 39, 2501-2506, 6 pages.
Arceneaux, Ph.D., "Mitigation of Oxygen Inhibition to Improve the UV LED Cure Process", Allnex, 2015 Allnex Belgium SA, 20 pages.
Kiyoi, "Wood Coating with UV-LED Curing: A Focus on Heat", Radtech Report Issue 2, 2014, 6 pages.
Schwalm, "UV Coatings Basics, Recent Developments and New Applications", Elsevier Science, Dec. 21, 2006, 316 pages.
Notification of Transmittal of the International Search Report and the Written Opinion of the International Searching Authority, or the Declaration of International (PCT) Application No. PCT/US2017/032430 dated Jul. 31, 2017, 11 pages.

Chen et al., "Thermal properties and flame retardancy of an ether-type UV-cured polyurethane coating", eXPRESS Polymer Letters, vol. 4, No. 9 2010.
Norland Products, "Norland UV Curing Adhesives", Retrieved from URL https://www.norlandprod.com/Uvdefault.html on Apr. 15, 2016, 8 pages.
Foster Miller, Inc., "UV Curable Aerospace Paint Systems", Feb. 28, 2008, 26 pages.
Allnex, "Introducing Allnex", 2014 Allnex Belgium SA, 30 pages.
Dvorchak, "1K UV-A Automotive Refinish; Clear Coats and Primers," Allnex Belgium SA, 2014, 12 pages.
Ye, S.; Cramer, N.B.; Smith, I.R.; Voigt, K.R.; Bowman, C.N.; "Reaction Kinetics and Reduced Shrinkage Stress of Thiol-Yne-Methacrylate and Thiol-Yne-Acrylate Ternary Systems", Macromolecules 44(23) 9084-9090 (2011) doi: 10.1021/ma2018809 (Thiol-Yne.pdf).
Ye, S.; Cramer, N.B.; Stevens, B.E.; Sani, R.L.; Bowman, C.N.; "Induction Curing of Thiol-Acrylate and Thiol-Ene Composite Systems", Macromolecules 44(12) 4988-4996 (2011) doi: 10.1021/ma200098e (YeInductionCuring.pdf).
Ashley, J.F.; Cramer, N.B.; Davis, R.H.; Bowman, C.N.; "Soft-lithography fabrication of microfluidic features using thiol-ene formulations", Lab on a Chip 11 2772-2778 (2011) doi: 10.1039/C1LC20189A (Ashley 1.pdf).
Cramer, N.B.; Stansbury, J.W.; and Bowman, C.N. "Recent Advances and Developments in Composite Dental Restorative Materials", Journal of Dental Research, 90 (4), 2011, 402-416.
Nair, D.P.; Cramer, N.B.; Scott, T.F.; Bowman, C.N.; and Shandas, R. "Photopolymerized Thiol-Ene Systems as Shape Memory Polymers", Polymer 2010, 51(19), 4383-4389. (TE SMP.pdf).
Boulden, J.E.; Cramer, N.B.; Schreck, K.M.; Couch, C.L.; Bracho-Troconis, C.; Stansbury, J.W.; and Bowman, C.N. "Thiol-ene-methacrylate composites as dental restorative materials", Dental Materials 2011, 27 Issue: 3 pp. 267-272. (Thiol-Ene3.pdf).
Ye, S.; Cramer, N.B.; Bowman, C.N. "Relationship between Glass Transition Temperature and Polymerization Temperature for Cross-Linked Photopolymers," Macromolecules, vol. 44 Issue: 3 pp. 490-494 Published: Feb. 8, 2011 (TgTcure.pdf).
Cramer, N.B.; Couch, C.L.; Schreck, K.M.; Boulden, J.E.; Wydra, R.; Stansbury, J.W.; and Bowman, C.N. "Properties of Methacrylate-Thiol-Ene Formulations as Dental Restorative Materials" Dental Materials, 26(8), 2010, 799-806. (Thiol-Ene2.pdf).
Cramer, N.B.; Couch, C.L.; Schreck, K.M.; Carioscia, J.A; Boulden, J.E.; Stansbury, J.W.; and Bowman, C.N. "Investigation of Thiol-Ene and Thiol-Ene-Methacrylate Based Resins as Dental Restorative Materials", Dental Materials, 26(1), 2010, 21-28. (MethThiolEne I.pdf).
Lee, T.Y.; Cramer, N.B.; Hoyle, C.E.; Stansbury, J.W.; and Bowman, C.N. "(Meth)Acrylate Vinyl Ester Hybrid Polymerizations", Journal of Polymer Science Part A. Polymer Chemistry, 47(10), 2009, 2509-2517. (MethVinylEsterHybrid.pdf).
Carioscia, J.; Schneidewind, L.H.; Cramer, N.; and Bowman, C.N. "Thiol-Nothornene Materials: Approaches to Develop High $T_g$ Thiol-Ene Polymers," J. Polym. Science, Part A. Polymer Chemistry, 45(23), 2007, 5686. (NorborneneJPSA.pdf).
Reddy, S.K.; Cramer, N.B.; and Bowman, C.N. "Thiol-Vinyl Mechanisms I: Termination and Propagation Kinetics in Thiol-Ene Photopolymerizations," Macromolecules, 2006, 39(10), 3673. (ThiolVinylMech I.pdf).
Reddy, S.K.; Cramer, N.B.; and Bowman, C.N. "Thiol-Vinyl Mechanisms II: Kinetic Modeling of Ternary Thiol-Vinyl Photopolymerizations," Macromolecules, 2006, 39(10), 3681. (ThiolVinylMech II.pdf).
Cramer, N.B.; Reddy, S.K.; Cole, M.; Hoyle, C.E.; and Bowman, C.N. "Initiation and Kinetics of Thiol-Ene Photopolymerizations without Photoinitiators," J. Polym. Science, Part A. Polymer Chemistry, 42 (22), 2004, 5817. (Initiation.pdf).
Cramer, N.B.; Reddy, S.K.; O'Brien, A.K.; and Bowman, C.N. "Thiol-Ene Photopolymerization Mechanism and Rate Limiting Step Changes for Various Vinyl Functional Group Chemistries," Macromolecules, 36 (21), 2003, 7964. (Th-Ene Rxn Order.pdf).

(56) References Cited

OTHER PUBLICATIONS

Reddy, S.K.; Cramer, N.B.; Cross, T.; Raj, R.; and Bowman, C.N. "Polymer-Derived Ceramic Materials from Thiol-ene Photopolymerizations," *Chemistry of Materials*, 15 (22), 2003, 4257. (ThiolCeraset.pdf).

Cramer, N.B.; Davies, T.; O'Brien, A.K.; and Bowman, C.N. "Mechanism and Modeling of a Thiol-ene Photopolymerization," *Macromolecules*, 36 (12), 2003, 4631-4636 (Mech&Model.pdf).

Cramer, N.B.; Scott, J.P.; and Bowman, C.N. "Photopolymerization of Thiol-ene Polymers without Photoinitiators," *Macromolecules*, 35 (14), 2002, 5361-5365.

Cramer, N.B.; and Bowman, C.N. "Kinetics of thiol-ene and thiol-acrylate photopolymerizations with real-time fourier transform infrared," *Journal of Polymer Science. Part A. Polymer Chemistry*, 39 (19), 2001, 3311. (Thiol-Ene2001.pdf).

Cramer, N.B.; Reddy, S.K.; Lu, H.; and Bowman, C.N. "Thiol-Ene Photopolymerization of Polymer Derived Ceramic Precursors," *J. Polym. Science, Part A. Polymer Chemistry*, 42, 2004, 1752.

Reddy, S.K.; Cramer, N.B.; O'Brien, A.K.; Cross, T.; Raj, R.; and Bowman, C.N. "Rate Mechanisms of a Novel Thiol-ene Photopolymerization Reaction," *Macromolecular Symposia*, 206, 2004, 361-374.

Cramer, N.B.; Harant, A.W.; Beckel, E.; Davies, T.; Williamson, D.L.; and Bowman, C.N. "Formation of a Host Nanostructure for Ferroelectric Liquid Crystals using Thiol-ene Polymers, " *Liquid Crystals*, 29 (10), 2002, 1291-1296.

Kilambi, H.; Cramer, N.B.; Schneidewind, L.H.; Shah, Parag; Stansbury, J.W.; and Bowman, C.N. "Evaluation of Highly Reactive Mono-(Meth)Acrylates as Reactive Diluents for BisGMA-Based Dental Composites", *Dental Materials*, 25(1), 2009, 33-38.

Hoyle, C. et al., "Thiol-click chemistry: a multifaceted toolbox for small molecule and polymer synthesis", Chemical Society Reviews, Feb. 2010, 34 pages.

Hoyle, C. et al., "Thiol-ene Click Chemistry", Reviews, Angsw. Chem. Int. Ed. 2010, 49, 1540-1573.

Lu, H., et al., "Investigations of step-growth thiol-ene polymerizations for novel dental restoratives", Dental Materials 2005, 21, 1129-1136.

BYK Additives & Instruments, "BYK-UV 3500", Data Sheet Issue Jun. 2013, 4 pages.

BYK, Safety Data Sheet, "BYK-UV 3500", Feb. 5, 2018, 10 pages.

BYK Additives & Instruments, "BRIEF BYK Regulatory Information—Extensive Form Product name: BYK-UV 3500", Version 1.0, 2018, 3 pages.

BYK, "BYK Standard Questionnaire for REACH Communication Product: BYK®-UV 3500", Version 1.0, 2018, 1 page.

Cramer, et al., "The Effects of Different Curing Methods on Tack-Free Curing", PCI Paint & Coatings Industry; Feb. 1, 2017; 15 pages.

Notification Concerning Transmittal of International Preliminary Report on Patentability for International (PCT) Application No. PCT/US2017/032430 dated Nov. 22, 2018, 10 pages.

International Search Report and Written Opinion for International (PCT) Application No. PCT/US2017/032430 dated Jul. 31, 2017, 10 pages.

International Preliminary Report on Patentability for International (PCT) Application No. PCT/US2017/032430 dated Nov. 13, 2018.

Lee, T.Y.; Smith, Z.; Reddy, S.K.; Cramer, N.B.; and Bowman, C.N. "Thiol-Allyl ether-Methacrylate Ternary Systems. 1. Polymerization Mechanisms," *Macromolecules*, 40(5), 2007, 1466. (TaiYeonTemary1.pdf).

O'Brien, A.K; Cramer, N.B.; and Bowman, C.N. "Oxygen Inhibition in Thiol-Acrylate Photopolymerizations," J. Polym. Science, Part A. Polymer Chemistry, 2006, 44 (6), 2007-2014.

\* cited by examiner

COMPOSITION FOR AEROSOL CANS, METHOD OF MAKING AND USING THE SAME

The present application claims the benefits of and priority, under 35 U.S.C. § 119(e) to U.S. Provisional Patent Application No. 62/626,070 filed Feb. 3, 2018, and is hereby fully incorporated herein by reference.

CROSS-REFERENCE TO RELATED APPLICATIONS

The present application is related to U.S. patent application Ser. No. 15/593,985, filed May 12, 2017, U.S. Provisional Patent Application No. 62/335,823 filed May 13, 2016, U.S. Provisional Application Ser. No. 62/382,968 filed Sep. 2, 2016, U.S. Provisional Application Ser. No. 62/413,199 filed Oct. 26, 2016, U.S. Provisional Application Ser. No. 62/430,125 filed Dec. 5, 2016, U.S. Provisional Patent Application No. 62/452,093 filed Jan. 30, 2017, U.S. Provisional Application Ser. No. 62/492,634 filed May 1, 2017, U.S. Provisional Application Ser. No. 62/492,644 filed May 1, 2017, and U.S. Provisional Application Ser. No. 62/537,319 filed Jul. 26, 2017, U.S. patent application Ser. No. 16/046,572 filed Jul. 26, 2018, each of the above-identified applications are hereby fully incorporated herein by reference as if fully set forth herein.

BACKGROUND OF THE INVENTION

Field of the Invention

The present invention generally relates to a volatile organic compound (VOC) free low radiant flux radiation curable composition, and more particularly to unique and novel uses of the composition such as via pressurized containers or aerosol cans filed with the same, for example, be used for decoration purposes and/or apply protective coatings.

Discussion of the Background

Radiation curable compositions are beginning to gain industry acceptance. In order to cure radiation curable coatings high radiant fluxes are required on the order of 5 W/cm² or higher at the surface. These high radiant fluxes are typically generated with high flux energy sources including electron beam energy sources, mercury vapor light energy sources, which emit radiation in radiation including ultraviolet A (UVA) radiation (315 nm to 400 nm), ultraviolet B (UVB) radiation (280 nm to 315 nm), ultraviolet C (UVC) radiation (100 nm to 280 nm), and infrared (IR) radiation (700 nm to 1000 nm). Moreover, these high radiant flux energy sources are dangerous and require UV shielding to protect the operator and passerbys from UV light. Finally, the high radiant flux energy sources cannot be used with temperature sensitive substrates, e.g., substrates that are sensitive to high temperatures.

Besides the high radiant fluxes required to cure conventional radiation curable compositions. Many conventional radiation curable compositions cannot cure to be tack free and are tacky after radiation curing due to oxygen inhibition. In practice, this requires using a nitrogen blanket in order to properly cure these UV compositions.

A need exists for a composition, system and method for using VOC free low radiant flux radiation curable composition.

SUMMARY OF THE INVENTION

Accordingly, the invention is directed to a VOC free low radiant flux curable composition and method of using the same that substantially obviates one or more of the problems due to limitations and disadvantages of the related art.

An advantage of the invention is to provide a system that allows for rapid application of a UV Curable Composition with an aerosol container.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a volatile organic compound (VOC) free low radiant flux radiation curable composition for an aerosol container. The composition including an acrylate-terminated compound component having a weight percent in a range from about 71.5 percent to about 95 percent, a thiol monomer or oligomer component having a weight percent in a range about 5 percent to about 40 percent, a photoinitiator component having a weight percent in a range of about 0.1 percent to about 8 percent, a surface additive component having a weight percent in range of about 0.1 percent to about 3 percent, an ethanol-based reducer and the composition does not include an acetone component.

In another aspect of the present invention, a pressurized aerosol container including a body having a first end and a second end, wherein the second end is a closed end having a concave surface. A dome region on the first end of the body where the dome is configured to accommodating a valve or valve assembly. A nozzle is attached to the valve and a diptube coupled to the valve. The main body also includes a propellant arranged inside the body and a UV curable composition including an acrylate-terminated compound component having a weight percent in a range from about 71.5 percent to about 95 percent, a thiol monomer or oligomer component having a weight percent in a range about 5 percent to about 40 percent, a photoinitiator component having a weight percent in a range of about 0.1 percent to about 8 percent, a surface additive component having a weight percent in range of about 0.1 percent to about 3 percent, and an ethanol-based reducer, wherein the UV curable composition does not include an acetone component.

In yet another aspect of the present invention, a method of applying a top coat to an automotive panel with an aerosol container containing a UV Curable Composition. The method includes providing an automotive panel and applying a predetermined color to the automotive panel. Next, the method includes sanding the surface of applied color of the automotive panel and cleaning the sanded surface with alcohol, e.g., isopropyl alcohol or other solvent. Next, applying with an aerosol container a UV curable composition to the sanded and cleaned applied color. The UV Curable Composition includes an acrylate-terminated compound component, a thiol monomer or oligomer component, a photoinitiator component, and optionally a surface additive component, and an ethanol-based reducer, wherein the UV Curable Composition does not include acetone. Next, an energy source is applied to the applied UV Curable Composition for 120 seconds or less having a wavelength in a range from about 360 nm to about 420 nm and a radiant flux at the surface of the coating of about 100 mW/cm² or less to cure the applied UV curable composition.

In still yet another aspect of the present invention, a protected surface or substrate includes a cured UV Curable Composition coating on said surface that was applied with an aerosol container.

This Summary section is neither intended to be, nor should be, construed as being representative of the full extent and scope of the present disclosure. Additional benefits, features and embodiments of the present disclosure are set forth in the attached figures and in the description herein below, and as described by the claims. Accordingly, it should be understood that this Summary section may not contain all of the aspects and embodiments claimed herein.

Additionally, the disclosure herein is not meant to be limiting or restrictive in any manner. Moreover, the present disclosure is intended to provide an understanding to those of ordinary skill in the art of one or more representative embodiments supporting the claims. Thus, it is important that the claims be regarded as having a scope including constructions of various features of the present disclosure insofar as they do not depart from the scope of the methods and apparatuses consistent with the present disclosure (including the originally filed claims). Moreover, the present disclosure is intended to encompass and include obvious improvements and modifications of the present disclosure.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

Figure 1:
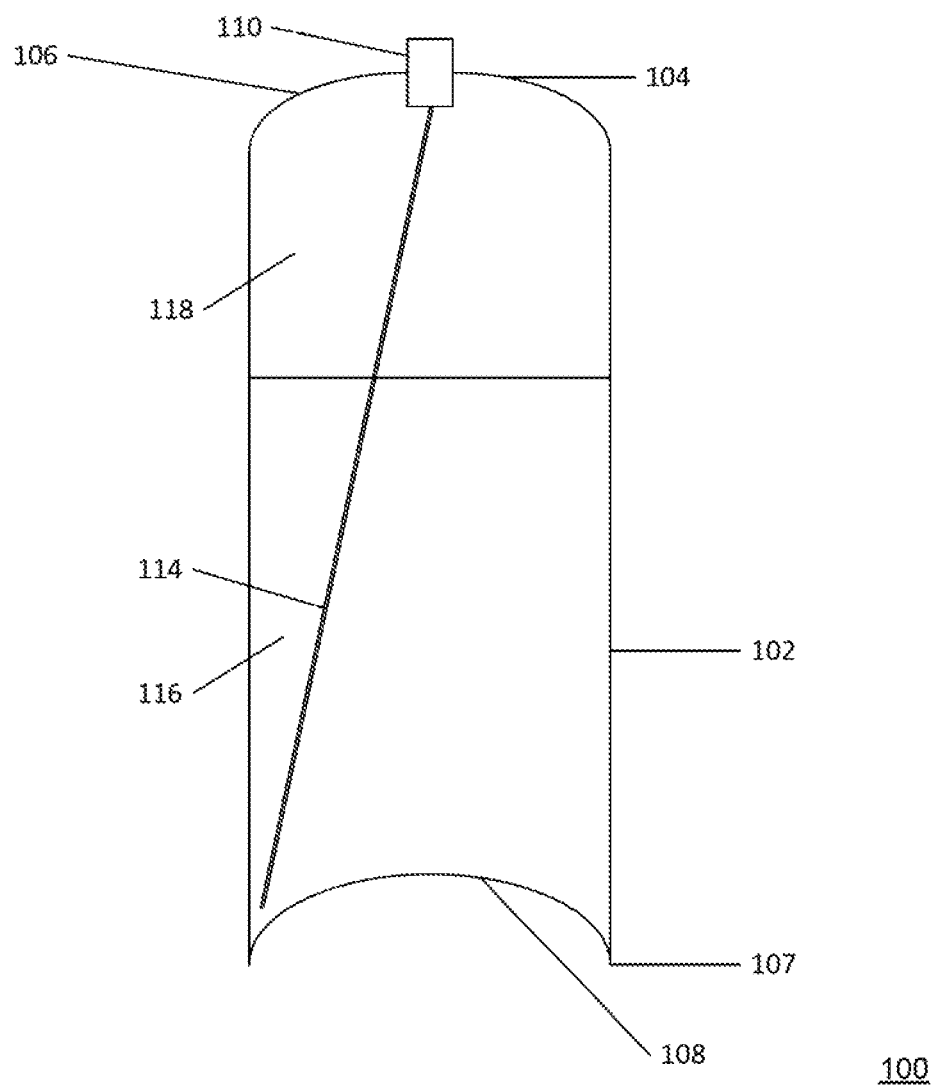
FIG. 1 illustrates an exemplary cross-sectional view of an aerosol can with a UV Curable Composition according to an embodiment of the invention.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION OF THE ILLUSTRATED EMBODIMENTS

The disclosure can provide a number of advantages depending on the particular aspect, embodiment, and/or configuration. These and other advantages will be apparent from the disclosure.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

It is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

In order to more fully appreciate the present disclosure and to provide additional related features, the following references are incorporated therein by reference in their entirety:

(1) U.S. Pat. No. 7,204,392, by Kwansy, et al., relating to a pressure pack aerosol can comprised of a body blank (2), of a dome (3) for accommodating a valve (4), of an inwardly arched bottom (5), of an inner sleeve (7), which is arranged on a disk (6), and of a tappet (9), which is arranged inside the inner sleeve (7), which is provided for splitting open said inner sleeve (7) and which can be displaced therethrough by the disk (6). According to the invention, the inner sleeve (7) is joined to the disk (6) via a spring cage (11), and the spring cage (11) contains a release mechanism (12), which is spring-mounted and which acts upon the tappet (9). Said tappet (9), in turn, acts upon a cover (8), which is arranged on the can-side end of the inner sleeve (7), and splits the cover open when actuated. A diaphragm (15) is arranged between the tappet (9) and the release mechanism (12) and hermetically seals the inner sleeve (7), on its disk-side end, off from the contents of the pressure pack aerosol can (1).

(2) U.S. Pat. No. 8,403,177, by Kwansy disclosing a pressurized can comprising a body (2), a dome (3) accommodating a valve (4), a concavely shaped bottom (5), an inner casing (7) attached to a cup (6), a push rod (9) arranged in the inner casing (7), said push rod (9) being actuated through the cup (6) and intended to force open the inner casing (7), with said inner casing (7) being joined to the cup (6) via a spring cage (11), said spring cage (11) containing a spring-loaded trigger (12) which acts on the push rod (9) which, in turn, acts on a cover (8) arranged at the can-side end of the inner casing (7), said cover (8) being a membrane which seals the inner casing (7) at its can-side end hermetically against the contents of the pressurized can (1) and which is torn open by the push rod (9) when the trigger (12) is actuated.

(3) U.S. Pat. No. 8,528,837, by Kwansy relates to an aerosol can comprising a body containing a propellant and an aerosol product, a valve whose actuation enables said aerosol product to be sprayed, and a spray head (1) which serves to discharge the aerosol product to the environment when the valve is actuated. The spray product discharge rate of the inventive aerosol can is adjustable by means of an adjusting device provided in the spray head (1). Said invention can primarily be used for aerosol paint cans in view of the fact that for such applications a controlled and uniform discharge rate is of particular importance in order to avoid painting defects.

(4) U.S. Pat. No. 9,493,292, by Kwansy relates to a spray head (1) for a spray can with the spray head to be placed on a valve having an inner valve seat, wherein said spray head (1) being provided with a tubular hollow cylinder (2) extending coaxially to the longitudinal axis of the spray can, said cylinder being coupleable to the valve and designed to include a passage (3) for the spraying product contained in the spray can, said passage (3) ending in an outlet nozzle (4) pointing in radial direction and said hollow cylinder (2) having an opening (5) on one of its longitudinal sides at its valve-side end so that actuating the spray head (1) allows the product to be sprayed to enter the hollow cylinder (2) through said opening (5), and wherein a rotatable regulating pin (6) extends through the passage (3) in the hollow cylinder (2), the outer diameter of said regulating pin (6) corresponding at its valve-side end to the inside diameter of the passage (3) arranged in the hollow cylinder (2) and said regulating pin (6) having at its valve-side end on one of its longitudinal sides a cutout (7) that, when said cutout (7) coincides with the opening (5) in the hollow cylinder (2), enables sprayed product to enter the passage (3), with the regulating pin (6) at its end facing away from the valve being connected to a rotatable regulator (8) accessible from the outside. In this manner a spray head (1) is provided that enables the discharge rate to be varied and effectively avoids an uncontrolled discharge of sprayed product from spray head (1). The invention is of special significance in the field of paint spray cans.

(5) U.S. Patent Application Publication No. 2001/0014700, by Kwansy relates to an aerosol preparation for two-component paint spray cans, in which the paint material consists of acrylic resins containing OH-groups, and the hardener consists of aliphatic polyisocyanatea. The paint material and hardener are filled in different containers within a spray can and united only immediately before they are processed, and jointly sprayed from the spray can via a propellant consisting of a propane/butane mixture. The weight ratio of diluted paint material to propellant amounts to about 75:25 to 70:30. The paint material consists of OH-group-containing high-solid acrylic resins with a higher solids content and with a mean molecular weight of <5000, and having no styrene and an OH-number of <150.

(6) U.S. Patent Application Publication No. 2016/0002475, by Potthoff, et al., relates to a water-based paint composition for aerosol cans containing A) 55 to 75% w/w of a paint component which contains 40 to 75% w/w, with respect to the paint component of an acrylate-based film-forming formulation in an aqueous medium, up to 10% w/w of a water-miscible polar solvent, up to 30% w/w of customary pigments, up to 15% w/w of matting agents, 2 to 15% w/w of additives, and up to 40% w/w of added water, and B) 25 to 45% w/w of a propellant gas component which, based on the propellant gas component, contains at least 75% w/w of dimethyl ether.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

Embodiments herein presented are not exhaustive, and further embodiments may be now known or later derived by one skilled in the art.

All percentages used herein are weight percentages as known in the art. The UV Curable composition, composition or VOC free low radiant flux radiation curable composition can be formulated into a variety of compositions in embodiments of the invention (herein "UV Curable Composition" or "composition" herein). In one embodiment, the composition includes the following components:

1. Acrylate-terminated compound(s) having a range from about 71.5% to about 94%;
2. Thiol monomers/oligomer(s)s having a range from about 5% to about 40%;
3. Photoinitiator(s) having a range from about 0.1% to about 8%;
4. Radical inhibitor(s) having a range from about 0% to about 0.5%];
5. Defoaming agents having a range from about 0% to about 3%;
6. Solvents having a range from about 0.1% to about 10%; and
7. Surface additive(s) to reduce surface tension having a range from 0% to about 20%.

Optional components:
6. Optional glass/silica fillers having a range from about 0% to about 60% which are used as a viscosity modifier, e.g., a paste a high percentage and also matting agents to adjust a sheen of a cure composition, e.g., gloss, matte, satin, egg shell, etc.; and
7. Optional pigments where the weight percent is added to desired color and/or opacity.

In one embodiment, a UV Curable Composition is added or charged in an aerosol can as known in the art. In one embodiment, the UV Curable Composition is charged, added or loaded in an aerosol can, the method of charging with propellant, loading into an aerosol can and/or the aerosol can are each described with reference to one or more of U.S. Pat. Nos. 7,204,392, 8,403,177, 8,528,837, 9,493,292, U.S. Patent Application Publication No. 2001/0014700, and U.S. Patent Application Publication No. 2016/0002475, each of which is hereby incorporated by reference. Other methods of charging, adding or loading the UV Curable Composition into an aerosol can also be utilized as may be known in the art.

Optionally and/or alternatively, in embodiment described herein alcohol or ethanol-based reducers can be used in the aerosol as a solvent. Moreover, the prepollent can be carbon dioxide or propane or other suitable prepollent as known in the art.

In embodiments herein the aerosol container is a type of dispensing system which creates an aerosol mist of liquid particles of the UV Curable Composition. This is used with a can or bottle that contains a payload and propellant under pressure. When the container's valve is opened, the payload is forced out of a small hole in a nozzle and emerges as an aerosol or mist. As propellant expands to drive out the payload, only some propellant evaporates inside the can to maintain a constant pressure. Outside the can, the droplets of propellant evaporate rapidly, leaving the payload suspended as very fine particles or droplets.

The resulting aerosol can including the UV Curable Composition is used in various methods as described herein. In preferred embodiment, the radiation energy used to cure the composition has a wavelength in range from about 355 nm to about 420 nm. The material can be cured without UVB radiation and UVC radiation. In a preferred embodiment, the wavelength to cure expelled UV Curable Composition from the aerosol can is in a range from 385 nm to 405 nm. In a preferred embodiment, the composition can be rapidly cured at a time of about 120 seconds or less to a tack-free coating at a radiant flux at the surface of the applied UV Curable Coating of 100 mW/cm$^2$ or less.

After the composition is expelled from the aerosol can it is cured, tack-free with UV or visible light irradiation from relatively low intensity light sources. It cures rapidly to form a glassy high modulus optically clear material. Excellent for use in protective coatings, optical and outdoor applications. Non-yellowing and low oxygen inhibition. Optionally, the formulations can be, but preferably do not need to be, reduced with alcohol, such as isopropyl alcohol, for application purposes.

In one embodiment, the composition is used to form a UV cured coating formed by applying a radiation energy source in a range from about 360 nm to about 420 nm at a surface power density (radiant flux at surface of applied coating) less than about 40 mW/cm$^2$ for time of 120 seconds or less to form a UV cured coating. A preferred radiation energy source is a LED light emitting energy in a range from about 10 mW/cm$^2$ to about 40 mW/cm$^2$ or less on a surface of substrate coated with a composition.

In one embodiment, the energy source can be adjusted or controlled such that low radiant flux at the surface of the material to be cured is variable, e.g., linearly ramped from high to low or vice versa, non-linearly ramped or a combination of linearly ramping and non-linear ramping from about 0 mW/cm$^2$ to about 400 mW/cm$^2$ over a specified time or greater. Optionally and/or alternatively, the radiant flux may be intermittent by pulsing the energy source such that the energy at surface is on and off for predetermined time intervals. The predetermine time internals may be from 1 nanosecond to 5 seconds or more. This can aid the curing of VOC free low radiant flux UV curable material as the curing process is a photochemical exothermic process. When using a temperature sensitive substrate one may want to minimize the temperature on the substrate caused by the exothermic curing and in such case predetermined wait time internals and applied time internals of the radiation can be configured to minimize temperature caused by the exothermic curing.

In one embodiment, the VOC free low radiant flux UV curable material has zero VOCs. The material cures rapidly to form a glassy high modulus optically clear material for example, the material may cure in two minutes or less. In a preferred embodiment, the material cures in one-hundred twenty seconds or less. The cured material is excellent for use in protective coatings, optical and outdoor applications and is non-yellowing when cured and has low oxygen inhibition.

In one implementation the composition can be cured at 5 mW/cm$^2$ in 120 seconds, 10 mW/cm$^2$ in 75 seconds, 20 mW/cm$^2$ in 30 seconds, and 40 mW/cm$^2$ in 20 seconds at a thickness of about 3-5 mils. Tack free as used herein can be determined by pressing a fresh latex glove against the surface of the polymer with moderate pressure. If the polymer is marred in any way the surface is tacky. If no residue is observed on the glove and the surface is unmarred, then the surface is considered to be tack free.

In one embodiment, the UV Curable Composition or composition can be embodied as a single component composition or system. As used herein, the term "single component composition" means a composition where, during storage of the composition, the composition and/or components are all admixed together but the properties of the composition, including viscosity, remain consistent enough over the time of storage to permit successful application of the coating onto a substrate at a later time.

The composition is preferably mostly or entirely solids. That is, the composition includes at least about 95% by weight solids, preferably at least about 98% by weight solids, and more preferably about 100% by weight solids, based upon the total weight of the composition taken as 100% by weight. The composition may have a viscosity [cps] at 25 C in a range from about 20 [cps] to about 1,000,000 [cps] or more, and in a preferred embodiment the viscosity 30 [cps] to 400 [cps] or more.

The composition is useful to coat a variety of different substrates, e.g., cement, wood, composites, ceramics, glass, polyolefins, polyamides, thermoplastic, metal, aluminum, polyimides, polyfluoro plastics, stainless steel, combinations of the same and the like. Other non-limiting examples of substrates include substrates made from various materials, such as alloy, metal, composites, cement, marble, wood, wood laminates, fiber glass, plastic, metal and combinations of the same.

Any suitable source of radiation may be used, e.g., radiation that emits radiation having a wavelength of 180 to 800 nanometers may be used in the practice of the present invention. Suitable sources are natural sunlight, mercury vapor lamps, carbon arcs, low pressure mercury vapor lamps, medium pressure mercury vapor lamps, high pressure mercury vapor lamps, swirl-flow plasma arcs, ultraviolet light emitting diodes and ultraviolet light emitting lasers, UV fluorescent tubes, and light emitting diodes (LEDs). Sunlight can also cure the composition.

More specifically, the composition can be a low-oxygen inhibited rapid cure to form an abrasion and scratch resistant and durable coating. The composition cures to a tack free coating in the presence of oxygen with a low radiant flux energy. In a preferred embodiment, the low radiant flux means the energy from the energy source at the surface of the material to be cured is less than 400 mW/cm$^2$, in a more preferred embodiment, the energy at the surface of the material to be cured is less than 300 mW/cm$^2$, in a more preferred embodiment, the energy at the surface of the material to be cured is less than 200 mW/cm$^2$, in a more preferred embodiment the energy at the surface of the material to be cured is less than 100 mW/cm$^2$, and in a most preferred embodiment, the energy at the surface of the material to be cured is less than 40 mW/cm$^2$. In another embodiment, the energy at the surface of the material to be cured is 20 mW/cm$^2$, 19 mW/cm$^2$, 18 mW/cm$^2$, 17 mW/cm$^2$, 16 mW/cm$^2$, 15 mW/cm$^2$, 14 mW/cm$^2$, 13 mW/cm$^2$, 12 mW/cm$^2$, 11 mW/cm$^2$, 10 mW/cm$^2$, 9 mW/cm$^2$, 8 mW/cm$^2$, 7 mW/cm$^2$, 6 mW/cm$^2$, 5 mW/cm$^2$, 4 mW/cm$^2$, 3 mW/cm$^2$, 2 mW/cm$^2$, 1 mW/cm$^2$, 0.5 mW/cm$^2$ or less.

In preferred embodiment, the radiation energy used to cure the composition has a wavelength in range from about 355 nm to about 420 nm. The applied composition or expelled composition from the aerosol can, e.g., material, can be cured without UVB radiation and UVC radiation. In a preferred embodiment, the wavelength is in a range from 385 nm to 405 nm. The composition can be rapidly cured at a time of about 120 seconds or less.

In one embodiment, the energy source can be adjusted or controlled such that low radiant flux at the surface of the material to be cured is variable, e.g., linearly ramped from high to low or vice versa, non-linearly ramped or a combination of linearly ramping and non-linear ramping from about 0 mW/cm$^2$ to about 400 mW/cm$^2$ over a specified time or greater. Optionally and/or alternatively, the radiant flux may be intermittent by pulsing the energy source such that the energy at surface is on and off for predetermined time intervals. The predetermined time internals may be from 1 nanosecond to 5 seconds or more. This can aid the curing of VOC free low radiant flux UV curable material as the curing process is a photochemical exothermic process. When using a temperature sensitive substrate one may want to minimize the temperature on the substrate caused by the exothermic curing and in such case predetermined wait time internals and applied time internals of the radiation can be configured to minimize temperature caused by the exothermic curing. The low radiant flux energy exposure activates the photoinitiator, causing polymerization to occur in embodiments where polymerizable monomers are present. The compositions rapidly cure in the presence of oxygen in ambient conditions to a tack free coating.

In one embodiment, when using a temperature sensitive substrate, one may want to minimize the temperature on the substrate caused by the exothermic curing and in such case predetermined wait time internals and applied time internals of the radiation can be configured to minimize temperature caused by the exothermic curing. The low radiant flux energy exposure activates the photoinitiator, causing polymerization to occur in embodiments where polymerizable monomers are present. The compositions rapidly cure in the presence of oxygen in ambient conditions to a tack free coating.

As used herein, the term "acrylate-terminated compound(s)" refers to a compound having acrylate groups (i.e., unsaturated sites of carbon carbon double bonds) present at one or more, or all, of the terminal ends of the compound. As indicated, the acrylate-terminated compound has greater than two unsaturated sites. In certain embodiments, the acrylate-terminated compound has greater than three unsaturated sites. In other embodiments, the acrylate-terminated compound has four or more unsaturated sites. As used herein, the terms "acrylate," "acrylic," and similar terms refer to the inclusion of the analogous methacrylate and methacrylic based molecules. The acrylate-terminated compound(s) can include methacrylate(s). In addition, acrylamides and other vinyl groups can also be used.

Non-limiting suitable acrylate-terminated compounds examples, e.g., acrylate monomers/oligomers, may include one or more of ethylene glycol di(meth)acrylate; triethylene glycol diacrylate; triethylene glycol dimethacrylate; tetraethyleneglycol dimethacrylate; tetraethylene glycol diacrylate; poly(ethylene glycol)dimethacrylates; the condensation product of bisphenol A and glycidyl methacrylate; 2,2'-bis[4-(3-methacryloxy-2-hydroxypropoxy)-phenyl]propane; hexanediol diacrylate; hexanediol dimethacrylate; ethoxylated hexanediol diacrylate; tripropylene glycol dimethacrylate; polyethylene glycol 400 diacrylate; butanediol di(meth)acrylate; neopentyl glycol di(meth)acrylate; hydroxyl pivalic acid neopentyl glycol diacrylate; glycerine triacrylate; diethylene glycol dimethacrylate; diethylene glycol diacrylate; dipropylene glycol dimethacrylate; dipropylene glycol diacrylate; pentaerythritol tetraacrylate; pentaerythritol ethoxylated (5) tetraacrylate; ditrimethylolpropane tetraacrylate; trimethylolpropane triacrylate; ethoxylated (3) trimethylolpropane triacrylate; tricyclodecane dimethanol diacrylate; tris(2-hydroxy ethyl) isocyanurate triacrylate; or similar and combinations thereof.

In a preferred embodiment, non-limiting examples of acrylate-terminated compounds may include one or more of tripropylene glycol diacrylate; triethylene glycol diacrylate; neopentylglycol diacrylate; hexanediol diacrylate; trimethylolpropane triacrylate; ethoxylated (3) trimethylolpropane triacrylate; tricyclodecane dimethanol diacrylate; tris(2-hydroxy ethyl) isocyanurate triacrylate; and combinations thereof.

Non-limiting examples of suitable thiol monomers/oligomers may include one or more of, mercaptan, ethylene glycol bis(thioglycolate); ethylene glycol bis(3-mercaptopropionate); pentaerythritol tetra(3-mercaptopropionate); trimethylolpropane tris(3-mercaptopropionate); pentaerythritol tetra(2-mercaptoacetate); trimethylolpropane tris(2-mercaptoacetate); 1,6-hexanedithiol, and combinations thereof.

In a preferred embodiment, the non-limiting examples of suitable thiol monomer/oligomers includes one or more of pentaerythritol tetra(3-mercaptopropionate); and pentaerythritol tetra(2-mercaptoacetate).

Non-limiting examples of suitable photoinitiators may include any type of photoinitiators that are capable of generating free radicals when exposed to visible light and/or UVA radiation and/or optionally UVB radiation and/or UVC radiation. A preferred class of photoinitiator is bisacyl phosphine oxides. In addition, the photoinitiator may include one or more of 2,2-dimethoxy-1,2-diphenylethan-1-one; bis(2,4,6-trimethylbenzoyl)-phenylphosphineoxide (BAPO/Irgacure 819); 1-hydroxycyclohexyl benzophenone; 2,4,6-trimethyl-benzoyl-diphenyl-phosphine-oxide (TPO); 2-hydroxy-2-methyl-1-phenyl-propan-1-one (irgacure 1173); ethyl(2,4,6-trimethylbenzoyl)-phenyl phosphinate (TPO-L); 1-hydroxycyclohexyl phenyl ketone (Irgacure 184); camphorquinone 2-benzyl-2-(dimethylamino)-4'-morpholinobutyrophenone; 2-methyl-1-[4-(methylthio)phenyl]-2-morpholinopropan-1-one; 4-hydroxyl benzophenone laurate; 4-methyl benzophenone; 4-phenyl benzophenone; 1-[4-(2-hydroxyethoxy)-phenyl]-2-hydroxy-2-methylpropanone; 2-hydroxy-2-methyl-1-phenylpropanone; bis (cyclopentadienyl) bis [2,6-difluoro-3-(1-pyrryl)phenyl titanium]; 2,2-dimethoxy-2-phenylacetophenone; 4-(4methylphenylthio)benzophenone; benzophenone; 2,4-diethylthioxanthone; 2-dimethylamino-ethylbenzoate; ethyl-4-(dimethylamino) benzoate; 2-ethylhexyl-4-dimethylaminobenzoate; 4'bis(diethylamino) benzophenone; isoamyl-4-(dimethylamino)benzoate; 2-isopropyl thioxanthone (ITX); methylbenzoylformate; methyl-o-benzoylbenzoate; 4-phenyl benzophenone; 2-(2-chlorophenyl)-1-[2-(2-chlorophenyl)-4,5-diphenyl-2H-imidazol-2-yl]-4,5-diphenyl-1H-imidazole; 4,4',4"-Methanetriyltris(N,N-dimethylaniline); benzoic acid, 4-(dimethylamino)-, 1,1'-[(methylimino)di-2,1-ethanediyl] ester; 2-hydroxy-1-[4-[4-(2-hydroxy-2-methylpropanoyl)phenoxy]phenyl]-2-methylpropan-1-one; Oligo[2-hydroxy-2-methyl-1-[4-(1-methylvinyl)phenyl] propanone]; 2-Hydroxy-2-methylpropiophenone; 2,4,6 trimethylbenzophenone and 4-methylbenzophenone; 2-hydroxy-2-methyl-1-phenyl-propan-1-one (Irgacure 1173); 2-hydroxy-1-(4-(4-(2-hydroxy-2-methylpropionyl)benzyl) phenyl)-2-methylpropan-1-one (Irgacure 127); bis(2,4,6-trimethylbenzoyl)-phenylphosphineoxide/2-hydroxy-2-methyl-1-phenyl-propan-1-one (Irgacure 2022); bis(2,4,6-trimethylbenzoyl)-phenylphosphine oxide (Irgacure 2100); 1-[4-(2-hydroxyethoxy)-phenyl]-2-hydroxy-2-methyl-1- propane-1-one (Irgacure 2959); 2-benzyl-2-dimethylamino-4'-morpholinobutyrophenone (Irgacure 369); 2-dimethylamino-2-(4-methyl-benzyl)-1-(4-morpholin-4-yl-phenyl)-butan-1-one (Irgacure 379); diphenyl (2,4,6-trimethylbenzoyl)-phosphine oxide/2-hydroxy-2-methyl-1-phenyl-propan-1-one (Irgacure 4265); 2,2-dimethoxy-1,2-diphenylethan-1-one (Irgacure 651); oxy-phenyl-acetic acid 2-[2-oxo-2-phenyl-acetoxy-ethoxy]-ethyl ester/oxy-phenyl-acetic acid 2-[2-hydroxy-ethoxy]-et (Irgacure 754); 2-methyl-1[4-(methylthio)phenyl]-2-morpholinopropan-1-one (Irgacure 907); 2,4,6-trimethylbenzoyldiphenylphosphine oxide (irgacure 8953X); and combinations thereof. One or more of the foregoing photoinitiators may require a co-imitator as known in the art.

In a preferred embodiment, non-limiting examples of suitable photoinitiators includes one or more of 2,4,6-trimethylbenzoyl-diphenyl phosphine oxide (TPO); ethyl(2,4,6-trimethylbenzoyl)-phenyl phosphinate (TPO-L); and bis(2, 4,6-trimethylbenzoyl)-phenylphosphineoxide (Irgacure 819/BAPO).

Non-limiting examples of suitable radical inhibitors may include one or more of N-nitrosophenylhydroxylamine; hydroquinone and derivatives; monomethyl ether hydroquinone; benzoquinone; methoxy hydroquinone; tert butyl catechol; phenothiazine; or pyrogallol. In one aspect, the inhibitors prevent the acrylate monomer photopolymerization from occurring before being activated by light. In a preferred embodiment, the radical inhibitors includes one or more of N-nitrosophenylhydroxylamine; pyrogallol; 1,4-benzenediol, 1,4-dihydroxybenzene (HQ); 4-hydroxyanisole (MEHQ); N-nitorosophenylhydroxylamine aluminium salt (Q1301); and combinations thereof.

Non-limiting examples of suitable surface additives include one or more silicone-containing surface additive or other non-silicone containing surface additives, e.g., polyacrylate-based additives.

Non-limiting examples of suitable defoaming agents include modified polydimethylsiloxanes, for example Dehydran 1293, 2293 as well as EFKA 2550, 2580, Foamstar A38, and MF324 offered by BASF, Drewplus 54374 by Ashland, Airex 901W, Foamex 805, and 822 by Theo Goldschmidt, Borchi Gol LA200 and Bochers AF0670 by OMG Borchers. Of course, other defoaming agents as known in the art may be utilized. The defoaming agents are capable of suppressing or making the foaming bubbles burst. In a preferred embodiment, defoaming agents are matched to the respective aqueous system and application.

Non-limiting examples of suitable solvents include one or more of alcohol, methanol, ethanol, isopropanol (IPA), toluene tetrahydrofuran (THF), and dimethyl sulfoxide (DMSO). Acetone is not a suitable solvent and is thought to be incompatible with compositions described herein. Therefore, the composition is acetone free, without acetone or does not include an acetone component.

Non-limiting examples of suitable surface additives include one or more silicone-containing surface additive or other non-silicone containing surface additives, e.g., polyacrylate-based additives. In one embodiment, the additives are solvent-free, solvent-borne and aqueous coating systems, printing inks and adhesive systems as well as ambient-curing plastic systems that have strong reduction of surface tension. In one embodiment, the surface additive is a cross-linking, silicone-containing surface additive. In one embodiment, the additive is non-toxic, e.g., it can be used for food contact applications and can include one or more surface additive from BYK, e.g., BYK-333; BYK-UV-3576; BYK-361 N; BYK-1794; BYK-1790; BYK-UV-3575; BYK-UV-3500, and BKUV-3575 and combinations of the same. In a non-preferred embodiment, the surface additive to reduce surface tension is a polyacrylate-based surface additive. In a preferred embodiment, the surface additive can be in a range from about 0.25 percent to about 3 percent, and in a more preferred embodiment about 1 percent. In addition, various surface additives are described with reference to U.S. patent application Ser. No. 16/046,572, which is hereby incorporated by reference for this purpose.

Non-limiting examples of suitable glass/silica fillers may include one or more of a silica particle; Kevlar veil; PET mesh; fiber mesh; metal mesh; Multi-Walled Carbon Nano-Tube (MWCNTs); Carbon NanoTube (CNTs); organoclay; clays; alumina; titania; zirconia; carbon, bioglass (or bioactive glass); hydroxyapatite (HA) particle/mesh; quartz, barium glass; barium salt; titanium dioxide; and combinations thereof. In a preferred embodiment the glass/silica include fumed silica particle.

Non-limiting examples of suitable pigments may include one or more conventional pigments, such as titanium dioxide, iron oxides, zinc phosphate, zinc sulfide, zinc oxide, barium sulfate, magnesium silicate and corrosion inhibiting pigments, e.g., strontium chromate, zinc phosphate and barium metaborate, can be included. Optionally and/or alternately, the pigments may include a matting agent to adjust the sheen or gloss, e.g., Matte, There are several methods of using the UV Curable Composition each of the methods are described with reference to U.S. patent application Ser. No. 15/593,985, which is hereby incorporated by reference as if fully set forth herein. In embodiments herein, the composition is applied with an aerosol can. Each of these methods may be utilized with the volatile organic compound (VOC) free low radiant flux radiation curable composition described herein and are incorporated by reference as if fully set forth herein. In various embodiments herein any of the compositions with or without one or more surface additives described herein in the specification can be used to top coat or otherwise applied to a number of different substrates by an aerosol can.

The substrates can include any substrate, e.g., aerospace interior components, e.g., honey comb panels such as composite panels, alloy panels, aluminum panels, and combinations of the same; bathware components; swimming pool surfaces, e.g., interior of swimming pools; automotive components; industrial panels; marine components; wood materials and wood like materials; veneers; cement structures; composite materials; and combinations of the same. The substrates may optionally and/or alternatively be fire treated materials or non-fire treated materials.

A method according to one embodiment includes one or more of: i.) applying the UV Curable Composition from an aerosol can to form a combination clearcoat, sealing agent and/or fire retardant in one step; ii.) applying the UV Curable Composition from an aerosol can to a substrate, e.g., wood, cement, metal, alloy, laminate, plastic, composite material, automotive products, marine parts, e.g., hull, wood, and combinations of each of the foregoing and the like; iii.) applying the UV Curable Composition from an aerosol can to automobile components as a clear coat or top coat; and iv.) applying the UV Curable Composition from an aerosol can to furniture as a clear coat.

Optionally and/or alternately, additional fire retardant components may be utilized. The coating is also believed to be useful as a fire retardant without additional components. Fire retardant or fire resistance means a coating with the ability to withstand fire. One quantification is the ability of the coating to pass a twelve second or sixty second vertical flammability test as set forth in 37 C.F.R. Part 25.853 (a) Amdt 25-116 Appendix F Part I (a)(1)(ii), which is hereby incorporated by reference. More specifically, a coating can be applied as described with U.S. patent application Ser. No. 15/593,985, but out of an aerosol container described herein and said coating is believed to be able to pass the 60 second vertical burn test also described in U.S. patent application Ser. No. 15/593,985, which is hereby incorporated by reference.

One embodiment is directed towards one or more of the following processes: UV Curable Composition applied from an aerosol can in the production of fishing poles and fishing lures. UV Curable Composition can be applied from an aerosol can for any purpose.

One embodiment is directed towards applying the UV Curable Composition with an aerosol container to form a tack free coating, low tack free cure time, rapid cure time, clear coat, volatile organic compound (VOC) free coating, and combinations of the same.

One embodiment is directed towards a method of coating a substrate with the UV Curable Composition via an aerosol container to form a glassy high modulus, with non-yellowing and low oxygen inhibition coating.

One embodiment is directed towards a method of applying a UV Curable Composition via an aerosol container as a cement sealer, wood sealer, a stain coating, an improved holdout coating and combinations of the same.

One embodiment of the invention is directed towards cured coating with a pencil hardness H in range from about 1H to about 6H or greater.

One embodiment of the invention is directed towards curing the VOC free low radiant flux UV curable material to a cure depth in a range from less than 1 mm to about 40 mm or less, in a preferred embodiment the cure depth is less than 1 mm. One embodiment of the invention is directed towards filing cracks in concrete or similar material and curing the material.

Holdout means the ability of a coating to remain at or near the surface of a substrate, as opposed to penetrating that substrate. Better holdout results in the appearance of a smoother, more uniform coated surface with increased gloss and depth as compared to a coated substrate with less holdout. This is true even though the same dry film thickness of coating may have been applied to both substrates. For instance, in a porous substrate, when a coating is applied, the coating may absorb or permeate into the substrate. One embodiment of the invention is directed towards a method that reduces the amount of the coating absorbed into the substrate, allowing more of the coating to remain at or near the surface of the substrate. By increasing holdout in this manner, the resulting substrate has a smoother overall surface, and the substrate requires a fewer number of coatings. By reducing the number of required coatings, the invention also provides the advantages of reducing labor and material costs, while maintaining a coating with desirable properties. Moreover, increased or improved holdout means decreased fiber raising and increased moisture resistance. It is believed, the substrate will require a fewer number of coatings to achieve a desired finish. It is also believed the invention will lead to reduced processing time and reduced labor and material costs. Moreover, it is believed the invention provides a way to size a three-dimensional substrate. It is further believed the substrate produced by the process of the invention will typically display an increased stiffness, strength, smoothness and/or weight. It is further believed the invention can produce a sized or pretreated board that is compatible with a variety of overcoats. In one embodiment, the invention is directed towards man-made fiber boards, such as low density, medium density and high density fiber boards, for example.

One embodiment of the invention is directed towards applying the UV Curable Coating with an aerosol container as a sealant and a top coat finish in one coating.

VOC free means a coating or coating composition that excludes organic chemicals, contains no organic chemicals, or has zero organic chemicals that have a high vapor pressure at ordinary room temperature. A high vapor pressure is a vapor pressure that results from a low boiling point, which causes large numbers of molecules to evaporate or sublimate from the liquid or solid form of the compound and enter the surrounding air, a trait known as volatility. For example, formaldehyde, which evaporates from paint, has a boiling point of only −19° C. (−2° F.).

One embodiment of the invention is directed towards applying the UV Curable Composition with an aerosol container on a broad variety of substrates, made from various materials, such as wood, wood laminates, fiber glass, plastic, metal and combinations of the same. Examples of typical substrates may be selected from the group including, but not limited to, substrates such as high density fiber board, medium density fiber board, low density fiber board, cardboard, chipboard, particle board, mini-blinds, Masonite, cement fiber board and mindy board. The coating can be cured as described herein and the process can be repeated to achieve the desired thickness.

Reference will now be made in detail to embodiments of the invention, example of which is illustrated in the accompanying text.

Figure 2:
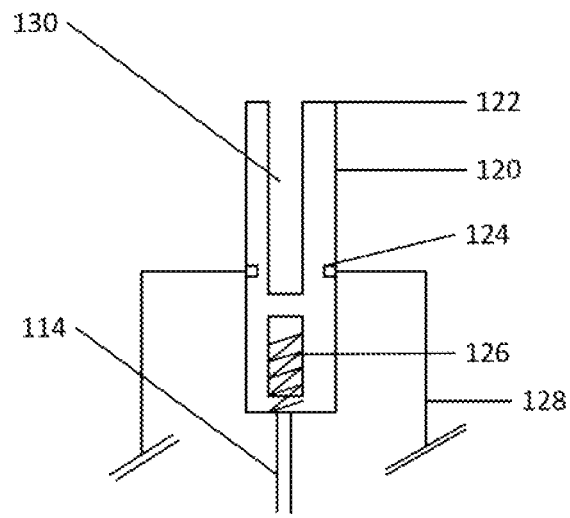
FIG. 2 illustrates an exemplary cross-sectional view of a valve assembly of FIG. 1 according to an embodiment of the invention.

FIG. 1 illustrates an exemplary cross-sectional view of an aerosol can with a UV Curable Composition according to an embodiment of the invention. FIG. 2 illustrates an exemplary cross-sectional view of a valve assembly of FIG. 1 according to an embodiment of the invention.

Figure 3:
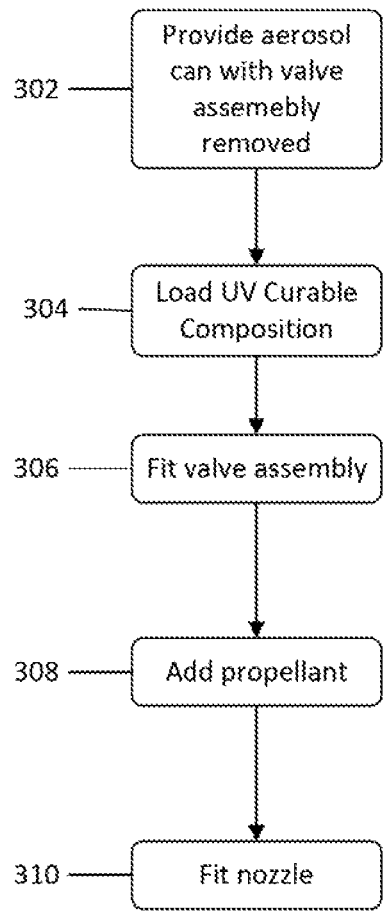
FIG. 3 illustrates a method of manufacturing an aerosol can with a UV Curable Composition according to an embodiment of the invention.

Referring to FIGS. 1 and 2, the aerosol can 100 is loaded with a UV Curable Composition and propellant as described in FIG. 3 and related text. The aerosol can 100 includes a main body 102 having a first end 104 and a second end 107. The first end 104 includes a dome region 106 accommodating a valve 110 between a seal 124. The second end 107 includes a concave region 108. The valve 110 is configured to operate from a first closed orientation to a second open orientation upon application of an external pressure greater than the biasing pressure of the spring 126.

In the open orientation the valve 110 allows the composition 116 to enter the diptube 114 and exits an orifice (not shown) of a nozzle (not shown) by pressure of the propellant 118 as described herein. The nozzle (not shown) is arranged and is coupled to the valve 110 as known in the art. The nozzle (not shown) may be any type nozzle as known in the art.

The valve 110 or valve assembly 110 includes a valve body 120 have a lumen 130 extending from a first end 122 to the diptube 114. The lumen 130 is configured to receive the composition 116 upon activation of the valve 110. The assembly 110 includes a spring 126 or other biasing member 126 configured to return and keep the valve in a closed position. The spring 126 is sized and dimensioned to achieve a predetermined biasing pressure. The valve releases the composition 116 as long as pressure is maintained to open on the valve 110. This is a continuous spray valve. A metered valve may also be utilized as known in the art. The metered valve only allows a predetermined volume of the composition to exit the valve.

The propellant 118 helps to disperse and mix the composition 116 in the aerosol can. In operation when the valve 110 is pressed (opened) it allows the composition 116 to enter a lumen of the diptube 114 and exit the valve 110 lumen 130 at the first end 122. This is due to the propellant 118 being at a higher pressure than the atmosphere allowing the composition 116 to escape via the diptube 114 and lumen 130. A seal 124 is used to fit the valve assembly 110 into an orifice of the body 128 of the aerosol can 100.

In this embodiment, there are two types of propellants liquified gas propellants or compressed gas propellants. Liquified gas propellants are gases that in liquid form under pressure. Since the interior of the body 102 is under pressure the propellant exists as a liquid and near the top of the body as a gas.

In embodiments herein, there are several different propellants that may be utilized, e.g., propellants described with reference to one or more of U.S. Pat. Nos. 7,204,392, 8,403,177, 8,528,837, 9,493,292, U.S. Patent Application Publication No. 2001/0014700, and U.S. Patent Application Publication No. 2016/0002475, each of which is hereby incorporated by reference.

Moreover, the propellants may be Propane, Butane, Isobutane or Dimethyl Ether and combinations of the same may be utilized herein. In a preferred embodiment, none of the propellants contain CFCs. However, CFC laden propellants could also be utilized. In addition, the following propellants may be used, heptafluoro propane (HFA-227), tetrafluoroethance (HFA-134a), difluoroethane (Propellant 152a), chlorodifluoromethane (Propellant 22), and chlorodifluoroethane (Propellant 142).

FIG. 3 illustrates a method of manufacturing an aerosol can with a UV Curable Composition according to an embodiment of the invention.

Referring to FIG. 3, the method 300 includes providing an aerosol can with a valve assembly removed (step 302). The aerosol can may be any type of aerosol can described herein or in the related art. The aerosol can is made from a metal, alloy, or thermoplastic material. The can is not transparent to ultraviolet light. The other components can also be made of a thermoplastic material or other materials as known in the art.

In step 304 a UV Curable Composition is provided into the aerosol can at a predetermined volume. In step 306, a valve assembly is fitted into the can with seals, e.g., seal 124, creating an air tight seal. In step 308, propellant is added at a predetermined volume and pressure. A nozzle is then attached to the valve assembly in step 310. The nozzle has an orifice sized to achieve a predetermined spray pattern and volume of spray as known in the art.

Optionally and/or alternatively, the order of steps may be adjusted. For example, in one embodiment, the aerosol can is provided with the valve assembly and propellant. Next, the UV Curable Composition is added. This method may be easier for the manufacturer of the aerosol by allowing the user to add any type of composition.

EXAMPLES

The following examples set forth preferred methods in accordance with the invention. It is to be understood, however, that these examples are provided by way of illustration and nothing therein should be taken as a limitation upon the overall scope of the invention.

The following Table provides Chemical Names and Suppliers that may be used herein.

TABLE

Chemical Names and Suppliers

| Product Name | Chemical Makeup | CAS Number | Type | Current Vendor |
|---|---|---|---|---|
| SR368D | mixture of tris (2-hydroxy ethyl) isocyanurate triacrylate and trimethylolpropane triacrylate | 15625-89-5 40220-08-4 | acrylate monomer/oligomer | Sartomer |
| TPGDA | Tripropyleneglycol diacrylate | 42978-66-5 | acrylate monomer/oligomer | Miwon |
| TMP(EO$_3$)TA | ethoxylated (3) trimethylolpropane triacrylate | 28961-43-5 | Acrylate monomer/oligomer | IGM Resins |
| Photomer 6008 | aliphatic urethane triacrylate | Proprietary | Acrylate oligomer | |
| PETMP | Pentaerythritol tetra(3-mercaptopropionate) | 7575-23-7 | thiol monomer/oligomer | Bruno Bock/Evans Chemetics |
| TPO | Diphenyl(2,4,6-trimethylbenzoyl)phosphine oxide | 75980-60-8 | photoinitiator | IGM Resins |
| TPO-L | ethyl(2,4,6-trimethylbenzoyl)-phenyl phosphinate | 84434-11-7 | Photoinitiator | IGM Resins |
| HQ | Hydroquinone | 123-31-9 | radical inhibitor | Aldrich |
| MEHQ | 4-methoxyphenol | 150-76-5 | radical inhibitor | Aldrich |
| TBC | 4-tert-butylcatechol | 98-29-3 | radical inhibitor | Aldrich |
| Q1301 | Aluminum n-nitrosophenylhydroxylamine | 15305-07-4 | radical inhibitor | Wako |
| IPA | Isopropanol | 67-63-0 | solvent/diluent | Univar |

In each of the following Examples, the compositions can be made by the following method. Weigh out desired components for a desired volume. Mix the inhibitors and photoinitiators and add the acrylate-terminated compound components to the inhibitors and photoinitiators. Optionally, the surface additive can be added with the acrylate-terminated compound at this time. Mix the mixture until all the solids are dissolved. Add the thiol monomer or oligomer components to the mixed mixture, cover, e.g., with foil, and mix until miscible. Record the viscosity. Optionally, other additives can now be added, e.g., pigments and matting agents and the like. Moreover, a solvent and/or diluent may be added to adjust the viscosity. It is noted that the pigments and other additives can be added sooner into the process.

Example 1

Example 1 relates to several UV curable composition for use in an aerosol can. In this Example 1, the composition again has a low viscosity, so that it can be loaded into an aerosol can and sprayed onto a substrate out of the can.

| Component | CAS No. | Supplier | Percent [%] |
|---|---|---|---|
| TMP(EO$_3$)TA | 28961-66-5 | IGM | 25.5 |
| TPGDA | 42978-66 | IGM | 59.5 |
| TPO | 75980-60-5 | IGM | 3 |
| HQ | 123-31-9 | Aldrich | 0.05 |
| MEHQ | 150-76-5 | Aldrich | 0.05 |
| TBC | 98-29-3 | Aldrich | 0.05 |
| PETMP | 7575-23-7 | Evens Chemical | 15 |

The foregoing composition can be loaded into an aerosol can as known in the art. After it is loaded it can be expelled out of an aerosol can by operation of the actuator. It has a low viscosity or sprayable viscosity.

The composition can also be modified with any other components as described herein. For example, a matting agent can be utilized to adjust the finish to a matte finish, a gloss finish or a satin finish. For example, ACEMATT® 3600 is a high performance, very fine-grained polymer-treated precipitated silica. This product is especially developed for 100% radically curing UV-coatings obtaining films with very high surface smoothness. Other types and percentages of matting agents may be utilized.

To achieve a Satin finish of about 4 to about 5 percent of ACEMATT® 3600 is added to the composition in a post adjustment process. Adjusting the percentage of matting agent adjusts the sheen as known in the art.

In addition, optionally and/or alternatively, a pigmented component can also be added to adjust the color to any combination of red, green and blue, e.g., white, black, almond, yellow, red, blue, and combinations thereof. The pigment and matting agent can be added post composition formation.

Example 2

Example 2 relates to several UV curable composition for use in an aerosol can. In this Example 2, the composition again has a low viscosity, so that it can be loaded into an aerosol can and sprayed onto a substrate out of the can.

| Component | CAS No. | Supplier | Percent [%] |
|---|---|---|---|
| TMP(EO$_3$)TA | 28961-66-5 | IGM | 24.7 |
| TPGDA | 42978-66 | IGM | 57.7 |
| TPO | 75980-60-5 | IGM | 2.9 |
| HQ | 123-31-9 | Aldrich | 0.05 |
| MEHQ | 150-76-5 | Aldrich | 0.05 |
| TBC | 98-29-3 | Aldrich | 0.05 |
| PETMP | 7575-23-7 | Evens Chemical | 14.6 |

The foregoing composition can be expelled out of an aerosol can. It has a low viscosity or sprayable viscosity. The composition can also be modified with any other components as described herein. For example, a matting agent can be utilized to adjust the finish to a matte finish, a gloss finish or a satin finish and/or pigment may be added as described herein with Example 1.

Example 3

Example 3 relates to several UV curable composition for use in an aerosol can. In this Example 3, the composition has a low viscosity, so they can be loaded into an aerosol can and sprayed onto a substrate. There are both a premium and an economy version explained in this Example. The premium version is believed to exhibit higher modulus than the economy version due to the use of SR368D. The economy version is less expensive to manufacture due to the use of increased amounts of TPGDA and no SR368D.

| Premium Sprayable Composition | | Economy Sprayable Composition | |
|---|---|---|---|
| Component | Percent [%] | Component | Percent [%] |
| SR368D | 59.41 | TPGDA | 83.72 |
| PETMP | 19.80 | PETMP | 14.77 |
| TPO | 0.79 | TPO | 1.48 |
| HQ | 0.06 | Q1301 | 0.03 |
| MEHQ | 0.06 | | |
| TBC | 0.06 | | |

| Alternative Composition: | |
|---|---|
| Component | Percent [%] |
| TPGDA | 24.72 |
| TMP(EO$_3$)TA | 57.68 |
| PETMP | 14.54 |
| TPO-L | 2.91 |
| HQ | 0.05 |
| MEHQ | 0.05 |
| TBC | 0.05 |

The foregoing composition can be expelled out of an aerosol can. It has a low viscosity or sprayable viscosity. The composition can also be modified with any other components as described herein. For example, a matting agent can be utilized to adjust the finish to a matte finish, a gloss finish or a satin finish and/or pigment may be added as described herein with Example 1.

Example 4

Example 4 relates to several UV curable composition for use in an aerosol can. In this Example 4, the composition again has a low viscosity, so that it can be loaded into an aerosol can and sprayed onto a substrate out of the can.

| Component | Percent [%] |
|---|---|
| Photomer 6008 | 14.54 |
| TMP(EO₃)TA | 67.87 |
| PETMP | 14.54 |
| TPO-L | 2.91 |
| HQ | 0.05 |
| MEHQ | 0.05 |
| TBC | 0.05 |

The foregoing composition can be expelled out of an aerosol can. It has a low viscosity or sprayable viscosity. The composition can also be modified with any other components as described herein. For example, a matting agent can be utilized to adjust the finish to a matte finish, a gloss finish or a satin finish and/or pigment may be added as described herein with Example 1.

Example 5

Example 5 relates to several UV curable composition for use in an aerosol can. In this Example 5, the composition again has a low viscosity, so that it can be loaded into an aerosol can and sprayed onto a substrate out of the can. This example also includes a surface additive to reduce surface tension.

| Component | CAS No. | Supplier | Percent [%] |
|---|---|---|---|
| TMP(EO₃)TA | 28961-66-5 | IGM | 25.5 |
| TPGDA | 42978-66 | IGM | 59.5 |
| TPO-L | 75980-60-5 | IGM | 3 |
| BYK-333 | Prop | BYK | 0.3 |
| HQ | 123-31-9 | Aldrich | 0.05 |
| MEHQ | 150-76-5 | Aldrich | 0.05 |
| TBC | 98-29-3 | Aldrich | 0.05 |
| PETMP | 7575-23-7 | Evens Chemical | 15 |

The foregoing composition can be expelled out of an aerosol can. It has a low viscosity or sprayable viscosity. The composition can also be modified with any other components as described herein. For example, a matting agent can be utilized to adjust the finish to a matte finish, a gloss finish or a satin finish and/or pigment may be added as described herein with Example 1. Other surface additives and percentages to reduce surface tension may also be utilized as described herein. Moreover, surface additives may be used as described with reference to U.S. application Ser. No. 16/046,572, which is hereby incorporated by reference as if fully set forth herein.

Example 6

Example 6 relates to several UV curable compositions for use in an aerosol can. In this Example 6, the composition again has a low viscosity, so that it can be loaded into an aerosol can and sprayed onto a substrate out of the can.

| Component | CAS No. | Supplier | Percent [%] |
|---|---|---|---|
| TMP(EO₃)TA | 28961-66-5 | IGM | 81.6 |
| TPO | 75980-60-5 | IGM | 2.88 |
| HQ | 123-31-9 | Aldrich | 0.05 |
| MEHQ | 150-76-5 | Aldrich | 0.05 |
| TBC | 98-29-3 | Aldrich | 0.05 |
| PETMP | 7575-23-7 | Evens Chemical | 14.4 |

The foregoing composition can be expelled out of an aerosol can. It has a low viscosity or sprayable viscosity. The composition can also be modified with any other components as described herein. For example, a matting agent can be utilized to adjust the finish to a matte finish, a gloss finish or a satin finish and/or pigment may be added as described herein with Example 1.

Example 5

Example 5 relates to several UV curable composition for use in an aerosol can. In this Example 5, the composition again has a low viscosity, so that it can be loaded into an aerosol can and sprayed onto a substrate out of the can. This example also includes a surface additive to reduce surface tension.

| Component | CAS No. | Supplier | Percent [%] |
|---|---|---|---|
| TMP(EO₃)TA | 28961-66-5 | IGM | 81.6 |
| TPO | 75980-60-5 | IGM | 2.88 |
| BYK-333 | N/A | BYK | 0.3 |
| HQ | 123-31-9 | Aldrich | 0.05 |
| MEHQ | 150-76-5 | Aldrich | 0.05 |
| TBC | 98-29-3 | Aldrich | 0.05 |
| PETMP | 7575-23-7 | Evens Chemical | 14.4 |

The foregoing composition can be expelled out of an aerosol can. It has a low viscosity or sprayable viscosity. The composition can also be modified with any other components as described herein. For example, a matting agent can be utilized to adjust the finish to a matte finish, a gloss finish or a satin finish and/or pigment may be added as described herein with Example 1. Other surface additives to reduce surface tension may also be utilized as described herein. In addition, other surface additives can be utilized to reduce surface tension as described herein. Moreover, surface additives may be used as described with reference to U.S. application Ser. No. 16/046,572, which is hereby incorporated by reference as if fully set forth herein.

Example 8

In Example 8, 4 oz of a UV Curable Composition described with reference to Example 1 was added to Spray-Max FillClean 3682071 with a mechanical press. The can includes a propellant and solvent as known in the art. The aerosol can was loaded with the composition sprayed in direct sunlight to coat wood and metal substrates. The coating cured within 2-4 minutes in direct sunlight after arriving on a substrate.

The UV Curable Composition was expelled onto various substrates and various distances. It is important to note that the composition did not cure exiting the nozzle until it arrived on the substrate. Moreover, the curing could be accomplished as described herein with a radiation source.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, include components, methods, processes, systems and/or apparatus substantially as depicted and described herein, including various aspects, embodiments, configurations embodiments, sub combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this description, with each claim standing on its own as a separate preferred embodiment of the disclosure.

Moreover, though the description has included a description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed:

1. A pressurized aerosol container, comprising:
   a body having a first end and a second end, wherein the second end is a closed end having a concave surface;
   a dome on the first end of the body, the dome accommodating a valve;
   a diptube coupled to the valve;
   a propellant arranged inside the body; and
   a single component VOC free UV curable composition arranged inside the body, wherein the single component VOC free UV curable composition does not include an acetone component, wherein the single component VOC free UV curable composition is capable of at least partial curing by applying an energy source for 120 seconds or less having a wavelength in a range from about 360 nm to about 420 nm and a radiant flux at a surface of an applied single component VOC free UV curable composition of about 100 mW/cm$^2$ or less.

2. The aerosol container of claim 1, wherein the valve is a continuous valve.

3. The aerosol container of claim 1, wherein the single component VOC free UV curable composition comprises an acrylate monomers/oligomers, a thiol monomers/oligomers, a radical inhibitor, and a photo initiator.

4. The aerosol container of claim 3, wherein the single component VOC free UV curable composition further comprises a solvent.

5. The aerosol container of claim 3, wherein the single component VOC free UV curable composition further comprises a surface additive.

6. The aerosol container of claim 1, wherein the single component VOC free UV curable composition further comprises a fire retardant component.

7. The aerosol container of claim 1, wherein the single component VOC free UV curable composition further comprises one or more pigments.

8. The aerosol container of claim 1, wherein the single component VOC free UV curable composition further comprises matting agent to adjust a sheen or gloss.

9. A pressurized aerosol container, comprising:
   a body having a first end and a second end, wherein the second end is a closed end having a concave surface;
   a dome on the first end of the body, the dome accommodating a valve;
   a diptube coupled to the valve;
   a propellant arranged inside the body; and
   a single component VOC free UV curable composition, wherein the single component VOC free UV curable composition is capable of curing by applying an energy source having a wavelength in a range from about 360 nm to about 420 nm and a radiant flux at a surface of an applied single component VOC free UV curable composition of about 100 mW/cm$^2$ or less.

10. The aerosol container of claim 9, wherein the single component VOC free UV curable composition comprises an acrylate monomers/oligomers, a thiol monomers/oligomers, a radical inhibitor, and a photo initiator.

11. The aerosol container of claim 10, wherein the single component VOC free UV curable composition further comprises a solvent.

12. The aerosol container of claim 10, wherein the single component VOC free UV curable composition further comprises a surface additive.

13. The aerosol container of claim 10, wherein the single component VOC free UV curable composition further comprises a fire retardant component.

14. The aerosol container of claim 10, wherein the single component VOC free UV curable composition further comprises one or more pigments.

15. The aerosol container of claim 10, wherein the single component VOC free UV curable composition further comprises matting agent configured to adjust a sheen or gloss.

16. The aerosol container of claim 9, wherein the single component VOC free UV curable composition comprises an acrylate monomers/oligomers, a thiol monomers/oligomers, a radical inhibitor, a photo initiator, a solvent, a surface additive and one or more pigments.

17. The aerosol container of claim 9, wherein the single component VOC free UV curable composition comprises an acrylate monomers/oligomers, a thiol monomers/oligomers, a radical inhibitor, a photo initiator, a solvent, a surface additive, and matting agent configured to adjust a sheen or gloss.

18. The aerosol container of claim 17, wherein the single component VOC free UV curable composition further comprises a one or more pigments.

19. A pressurized aerosol container, comprising:
a body having a first end and a second end, wherein the second end is a closed end having a concave surface;
a dome on the first end of the body, the dome accommodating a valve;
a diptube coupled to the valve;
a propellant arranged inside the body; and
a single component VOC free UV curable composition comprising:
an acrylate monomers/oligomers;
a thiol monomers/oligomers;
a radical inhibitor; and
a photo initiator, wherein the single component VOC free UV curable composition does not include an acetone component, wherein the single component VOC free UV curable composition is capable of curing by applying an energy source having a wavelength in a range from about 360 nm to about 420 nm and a radiant flux at a surface of an applied single component VOC free UV curable composition of about 100 mW/cm$^2$ or less.

20. The aerosol container of claim 19, wherein the single component VOC free UV curable composition further comprises a fire retardant component.

* * * * *